S. A. MATHERS.
BRAKE MECHANISM.
APPLICATION FILED SEPT. 27, 1916.

1,230,002.

Patented June 12, 1917.
3 SHEETS—SHEET 1.

Inventor
Samuel A. Mathers

By
C. C. Shephard
Attorney

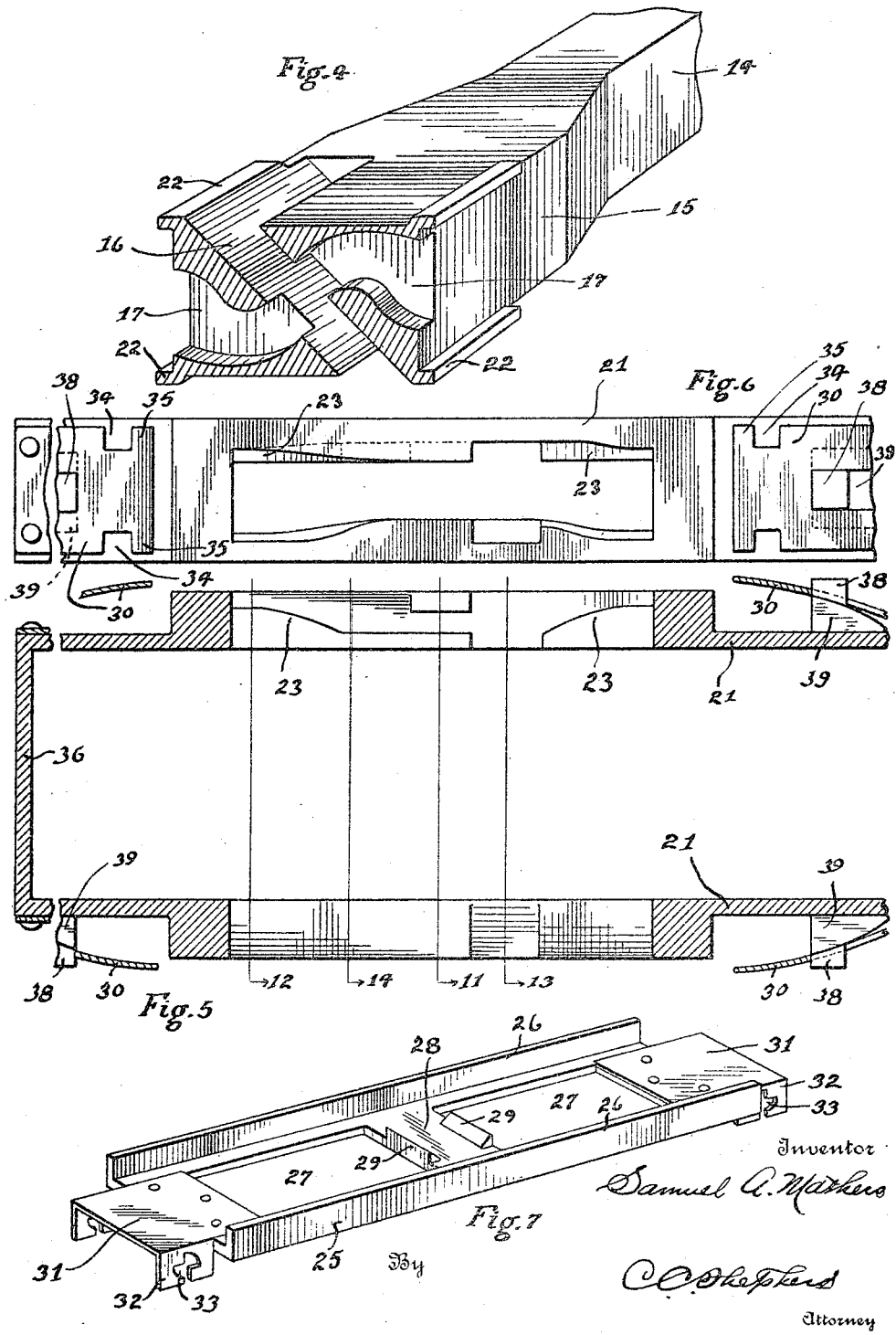

S. A. MATHERS.
BRAKE MECHANISM.
APPLICATION FILED SEPT. 27, 1916.
1,230,002.
Patented June 12, 1917.
3 SHEETS—SHEET 3.
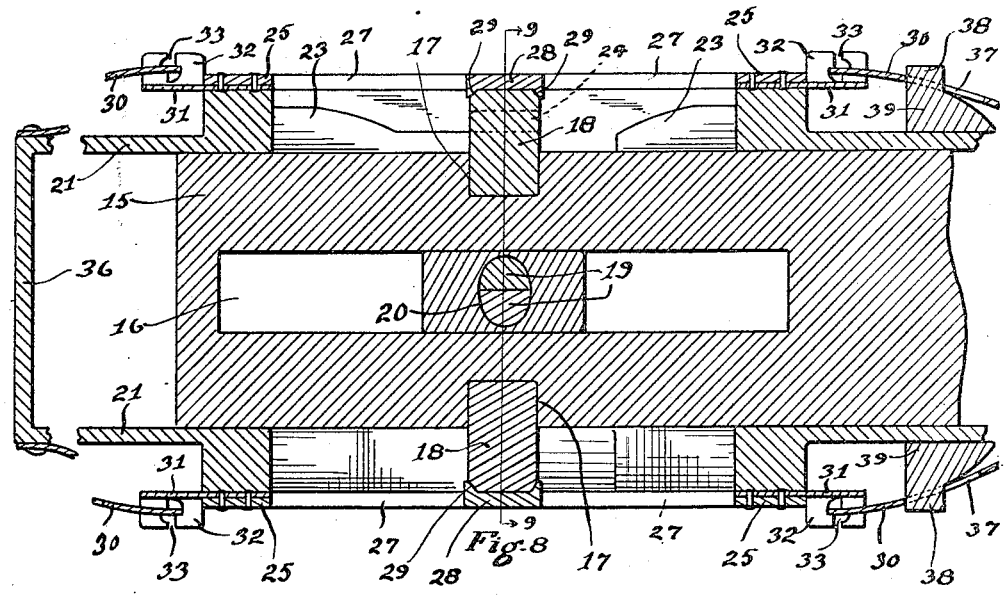
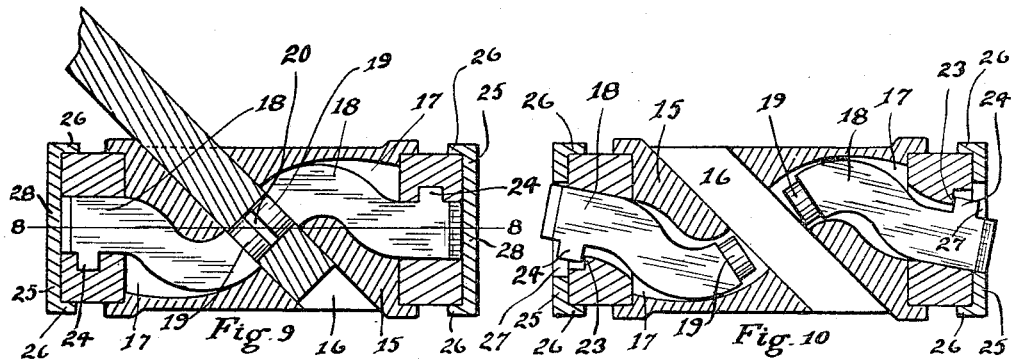
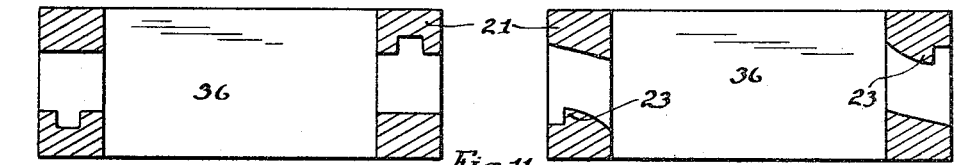
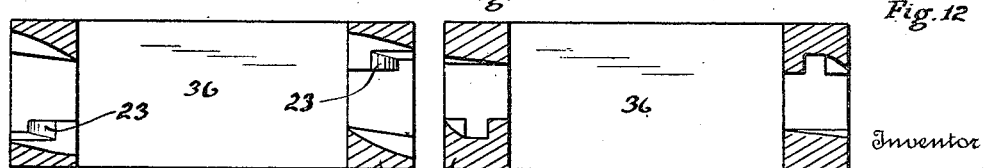
Inventor
Samuel A. Mathers
By
C. C. Shepherd Attorney

UNITED STATES PATENT OFFICE.

SAMUEL A. MATHERS, OF CHILLICOTHE, OHIO.

BRAKE MECHANISM.

1,230,002.  Specification of Letters Patent.  Patented June 12, 1917.

Application filed September 27, 1916. Serial No. 122,531.

*To all whom it may concern:*

Be it known that I, SAMUEL A. MATHERS, a citizen of the United States, residing at Chillicothe, in the county of Ross and State of Ohio, have invented certain new and useful Improvements in Brake Mechanisms, of which the following is a specification.

This invention relates to brake mechanisms and is particularly directed to an improved type of truck rod designed to connect the lower ends of the live and dead levers forming a portion of such mechanisms.

The main object of this invention resides in a structure calculated to reduce the cost of up-keep for this portion of the mechanism of railway cars. As the slack in the brake mechanism gradually increases due to wear or other causes, these truck rods come closer to the ground and in a great many instances, they come so close as to strike an obstruction in the roadbed during the normal course of travel. This results in the breakage of many parts, since all of the parts are operatively connected together. To this end, my invention contemplates the provision of a structure whereby the bottom truck rod is automatically released from its operative engagement with the live and dead levers to be deposited upon the roadbed upon striking an obstruction. In this manner, the remaining structure is not broken or strained and likewise, the truck rod may be reused, since the structure is such that the truck rod itself is not broken or destroyed.

A further object of this invention resides in a dog structure for forming the operative connection between the levers and the truck rod, together with mechanism for automatically withdrawing these dogs from their position of engagement when the truck rod strikes an obstruction.

Figure 1:
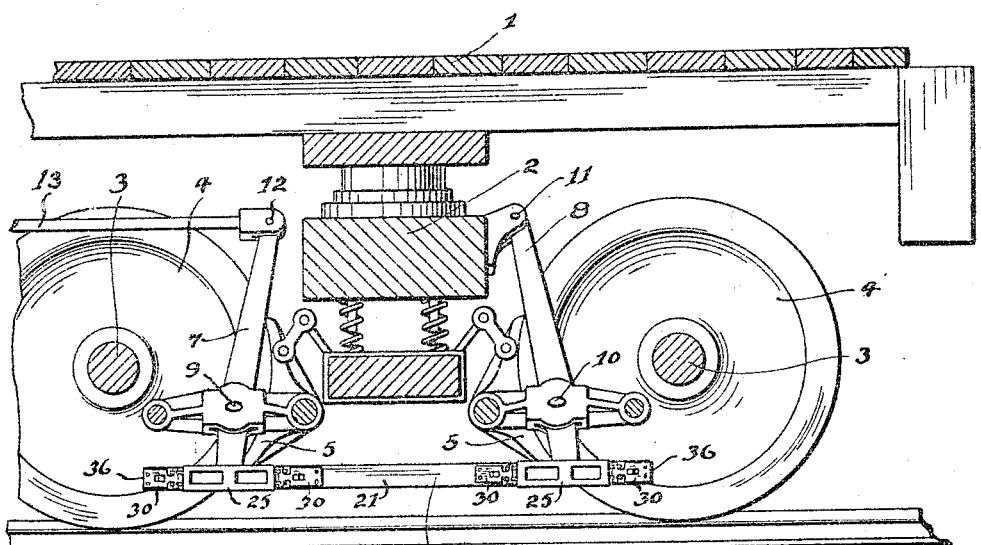
Figure 2:
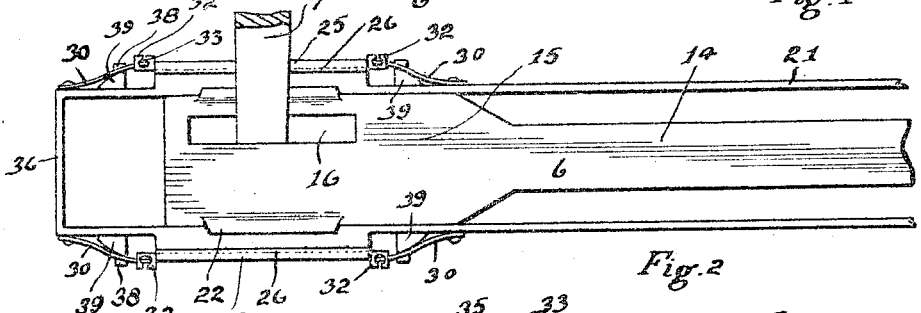
Figure 3:
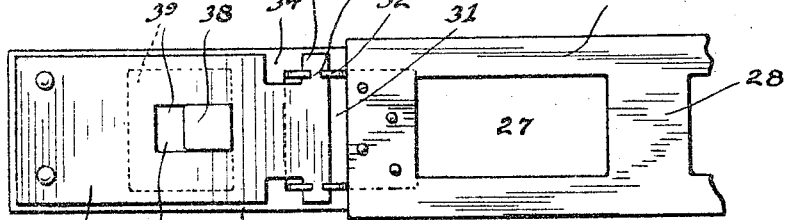

Further objects of this invention will become more apparent after a detailed description of the accompanying sheets of drawings, in which similar characters of reference designate corresponding parts and in which:

Figure 1 is a central vertical section taken through a portion of a railway car truck, showing my invention applied, Fig. 2 is a top plan view of one end of my improved type of truck rod, it being understood that the opposite end of this truck rod is of similar construction, Fig. 3 is an enlarged side view of a portion of the structure shown in Fig. 2, Fig. 4 is a fragmentary view in perspective of a portion of the connector member used by me, Fig. 5 is a horizontal section of one end of the releaser member, which completely embraces the connector member, Fig. 6 is a side elevation of the structure shown in Fig. 5, Fig. 7 is a view in perspective of one of the holding elements used for holding the dogs in position, Fig. 8 is a horizontal section taken through the left hand end of the structure shown in Fig. 2, or as represented by line 8—8 of Fig. 9, Fig. 9 is a cross section taken on line 9—9 of Fig. 8, showing the dogs in their position of engagement with one of the operating levers, Fig. 10 is a similar section, but showing the dogs in their released position, and, Figs. 11, 12, 13 and 14 are cross sections respectively on lines 11—11, 12—12, 13—13 and 14—14 of Fig. 5.

In these several views, the car is designated by the reference numeral 1, the bolster by the numeral 2, the axles by the numerals 3 and the wheels by the numerals 4. Brake shoes 5 are designed to coöperate with the wheels in the customary manner and the mechanism for supporting them may be of any conventional type. My invention is concerned directly with the bottom truck rod 6 which pivotally connects the lower ends of the live and dead levers 7 and 8 respectively. These levers are respectively pivoted at 9 and 10 to a portion of the brake mechanism, while the upper end of the dead lever is pivoted to the bolster, as is shown at 11. The upper end of the live lever is pivotally connected at 12 to the top truck rod 13 which eventually connects the air cylinder, not shown.

The bottom truck rod itself comprises a connector member 14 having heads 15 at opposite ends, which heads are slotted as is shown at 16 at an angle of approximately forty-five degrees to accommodate the lower ends of the live and dead levers. The heads 15 of this connector member are also formed with transverse openings 17 of somewhat peculiar shape to accommodate the dogs 18. The openings 17 lead into the spaces formed by the slots 16 and each of the dogs 18 is provided with a rounded end 19 arranged to fit the apertures 20 in the ends of each of the live or dead levers. It is by means of these dogs that the levers are operatively engaged, structure being provided whereby these dogs are automatically retracted from their position of engagement upon impact.

The structure for withdrawing these dogs resides in what I have termed a releaser member shown in Figs. 5, 6 and 9 to 14 inclusive. This releaser member I have designated generally by the reference numeral 21 and is preferably of four sides to completely embrace the connector member as is illustrated in Fig. 2. This releaser member is designed to slide in the spaces formed by the outstanding lips or trackways 22 formed on the connector member itself and further, this releaser member is provided with a plurality of cam surfaces 23 designed to coöperate with the laterally projecting lip 24 carried by each of the dogs 18. The side portions of the releaser member adjacent the cam surfaces 23 are preferably open so that the dogs may be entirely released after they have been withdrawn from their operative positions and also, the portion 24 is additionally cut out to permit the insertion of the dogs when the structure is being assembled. To operatively hold the dogs in their positions of engagement with the live and dead levers, I have provided a pair of holding elements for each end of the connector member, one of these holding elements being shown in perspective in Fig. 7 and designated by the reference numeral 25. Each of these holding elements is provided with longitudinally outstanding flanges 26 designed to slide in connection with the releaser member as is illustrated in Figs. 9 and 10 and in addition, these releaser members are cut out, as is shown at 27, leaving the frame portion 28. The cut out portions 27 permit withdrawal of the dogs after they have been disengaged, while the frame portion 28 is designed to prevent the withdrawal of the dogs under ordinary conditions. These frame portions 28 are also provided with wedge surfaces 29 designed to coöperate with the beveled edges of the dogs 18 to prevent accidental shifting of the holding members. These holding members are yieldingly held in their operative position, which position is illustrated particularly in Fig. 8, the structure for holding them in such position being the leaf springs 30, one end of each of which is rigidly attached to the releaser member and the opposite end of each of which is operatively engaging one end of the holding members. The means of engagement between the springs 30 and the holding members is shown as being a plate 31 rigidly attached to the underside of each end of the holding members and provided with upturned sides 32. These upturned sides are slotted and apertured as is shown generally at 33, while each of the springs 30 is cut out as shown at 34 to present a pair of prongs 35. The springs are turned at right angles from the position shown in the drawings, so that the prongs 35 enter the slots 33 and after this the springs are turned to the position shown in the drawings and rigidly attached at their opposite ends to the releaser member. By this arrangement, the springs may be replaced by simply disconnecting them at their connection with the releaser member.

The tendency of these leaf springs is to force the holding members toward the side of the releaser member and in this manner the dogs 18 are held in their operative positions. However, should there be an obstruction upon the roadbed the releaser member is made sufficiently large to permit a sliding movement of the same, so that should either of its ends 36 strike the obstruction, the holding members 25 will be initially released against the pressure of their holding springs 30, because of the coaction between the beveled surfaces between the frame pieces 28 and the beveled corners of the dogs 18. After this release, further movement brings certain of the cam surfaces 23 in back of the lips 24 of the dogs to positively cause their withdrawal to the position shown in Fig. 10. Inasmuch as the only connection between the connector member and the levers is by means of these dogs, it follows that the entire lower truck rod is released and will then drop upon the roadbed without destroying any of its parts.

Referring to Fig. 3, it will be noted that each of the springs 30 is provided with a square opening 37 through which the square ends 38 of wedge members 39 project. These wedge members are designed for use in manually forcing the springs 30 to such position as to release the holding members 25. This is accomplished by shifting the wedge members 39 against the tension of the springs 30 by the application of a hammer to the projecting portions 38. After the dogs have been placed in position, these springs may again be released by moving the wedge members to the position shown in Fig. 2.

From the foregoing, it will be apparent that I have provided a truck rod structure wherein the brake mechanism is not destroyed by its striking an obstruction. Should the wear be sufficient to cause the parts to lie too close to the roadbed, the truck rod is automatically released from its operative position. In so doing, none of the parts are actually destroyed when it is likely that they should be scattered along the roadbed. Therefore, after these released truck rods have been recovered, they may again be put to use.

What I claim is:

1. In a brake mechanism, a bottom truck rod between the lower ends of the live and dead levers comprising a connector member, releasable means for operatively connecting the lower end of both of said levers to said member, and means operable under impact to disconnect said releasable means to free said member from the lower ends of both of said levers.

2. In a brake mechanism, a bottom truck rod between the lower ends of the live and dead levers comprising a connector structure connecting the lower ends of both of said levers, and means operable under impact to release said structure from the ends of said levers at substantially the same time to allow the connector structure to drop onto the roadbed.

3. In a brake mechanism, a bottom truck rod between the lower ends of the live and dead levers comprising a connector member, releasable means for operatively connecting the lower end of both of said levers to said member, and a releaser member movably mounted in connection with said connector member, said releaser member being movable in either a forward or rearward direction upon striking an obstruction to free said connector member from both of said levers to allow it to drop to the roadbed.

4. In a brake mechanism, a bottom truck rod between the lower ends of the live and dead levers comprising a connector member, dogs operating in conjunction with said member for operatively connecting it to the lower end of both of said levers, and a releaser member mounted in conjunction with said connector member to move in either a forward or rearward direction upon striking an obstruction to withdraw said dogs to free said connector member from both of said levers to allow it to drop to the roadbed.

5. In a brake mechanism, a bottom truck rod between the lower ends of the live and dead levers comprising a connector member slotted at their lower ends, dogs movable through said member and into said apertures to couple said levers to said member, a four sided releaser member extending around said connector member, and a cam structure on said releaser member operable, when the releaser member is moved in either a forward or rearward direction, to withdraw said dogs from their operative engagement with said levers.

6. In a brake mechanism, a bottom truck rod between the lower ends of the live and dead levers comprising a connector member slotted at opposite ends to receive said levers, said levers being apertured at their lower ends, dogs movable through said member and into said apertures to couple said levers to said member, a four sided releaser member extending around said connector member, said releaser member being slotted to permit the heads of said dogs to project therethrough, holding elements engaging said dogs to hold them in their operative positions, yieldable means for holding said holding elements in their operative position, and a cam structure on said releaser member operable, when the releaser member is moved in either a forward or rearward direction, to withdraw said dogs from their operative engagement with said levers.

7. In a brake mechanism a bottom truck rod between the lower ends of the live and dead levers comprising a connector member slotted at opposite ends to receive said levers, said levers being apertured at their lower ends, dogs movable through said member and into said aperture to couple said levers to said member, a four sided releaser member extending around said connector member, said releaser member being slotted to permit the heads of said dogs to project therethrough, holding elements engaging said dogs to hold them in their operative positions, spring means for holding said holding elements in their operative position, a cam structure on said releaser member operable, when the releaser member is moved in either a forward or rearward direction, to withdraw said dogs from their operative engagement with said levers, and supplemental means for causing said holding elements to release their holding engagement with said dogs.

In testimony whereof I affix my signature in presence of two witnesses.

SAMUEL A. MATHERS.

Witnesses:
 MILTON WHITE,
 EDNA GABLER.

Copies of this patent may be obtained for five cents each, by addressing the "Commissioner of Patents, Washington, D. C."